Patented May 9, 1933

1,908,633

UNITED STATES PATENT OFFICE

CHRISTIAN JOHANNES HANSEN, OF ESSEN-ON-THE-RUHR, GERMANY, ASSIGNOR, BY MESNE ASSIGNMENTS, TO THE KOPPERS COMPANY OF DELAWARE, OF PITTSBURGH, PENNSYLVANIA, A CORPORATION OF DELAWARE

PROCESS OF REMOVING CYANIDE COMPOUNDS FROM GASES

No Drawing. Application filed April 6, 1931, Serial No. 528,233, and in Germany April 5, 1930.

GRANTED UNDER SECTION 14, ACT OF MARCH 2, 1927, 357 O. G. 5

My invention relates to a process of removing cyanide compounds from gases, wherein the gas is washed with a solution of ammonium polysulphides, to which there is added either continuously or intermittently, sulphur in the elementary state and possibly ammonia, so that the cyanide compounds are separated in the form of ammonium sulphocyanate.

The invention is concerned with an improvement which makes it possible to employ the process described also for such gases which contain naphthaline, such as coal distillation gases. In such a case the cyanide compounds are removed practically completely from the gas. When naphthaline-containing coal distillation gases are washed with solutions of ammonium polysulphides, to which sulphur and possibly ammonia is added either continuously or intermittently, difficulties arise in so far as the washing solution becomes inert in reaction after a certain time, that is, the washing out of the cyanide compounds is incomplete.

The method according to the present invention consists in first removing the naphthaline from the coal distillation gas by intensive cooling, or in some other manner, for example by washing out with tar oils, whereupon the gas is washed with an ammonium polysulphide solution, which is given either continuously or intermittently an addition of sulphur and possibly also ammonia. It has been found that the naphthaline condenses in fairly considerable quantities in the polysulphide lye and more or less envelops the sulphur particles introduced therein, so that the latter are not wetted any more by the polysulphide lye.

The process according to the invention has the important advantage that this insulating of the sulphur particles is eliminated by removal of the naphthaline thus rendering possible the complete conversion of the sulphur with the ammonia to polysulphides and the complete removal of the cyanide compounds from the gases.

The gas as it comes from the ovens is first cooled down as usually to separate the tar therefrom. During such cooling the water and some of the ammonia separate out with the tar. After the gas is thus freed of tar, the gas is then treated to remove naphthalene therefrom either by intensive cooling or in some other usual and well known manner, for example, by washing out the naphthalene by means of tar oils. Thereafter the gas free of tar and naphthalene is washed with an ammonium polysulphide solution, to which is added, either continuously or intermittently, sulphur and, if there is an insufficient amount of ammonia in the gas, ammonia. Due to the latter treatment the cyanide compounds are removed from the gas in the form of ammonium sulphocyanate.

In the process according to the invention, the conversions given by the following equations take place in the separation of the cyanide compounds:

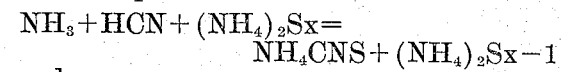

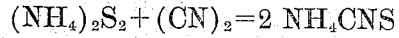

$$NH_3 + HCN + (NH_4)_2S_x = NH_4CNS + (NH_4)_2S_{x-1}$$

and $$(NH_4)_2S_2 + (CN)_2 = 2\ NH_4CNS$$

The polysulphide consumed in this reaction is formed afresh either continuously or intermittently by the above mentioned addition of elementary sulphur and ammonia to the washing fluid, but of course the addition of ammonia may be omitted if the gas already contains sufficient ammonia.

I claim

1. Method of removing cyanide compounds from naphthaline-containing coal distillation gases, recovering at the same time ammonium sulphocyanate, which method comprises treating said gas to remove the naphthaline from the gas and thereafter washing the gas with a cold aqueous ammonium polysulphide solution, to which sulphur is added, to remove cyanide compounds from the gas in the form of ammonium sulphocyanate.

2. Method of removing cyanide compounds from naphthaline-containing coal distillation gases, recovering at the same time ammonium sulphocyanate, which method comprises treating said gas to remove the naphthaline from the gas and thereafter washing the gas with a cold aqueous ammonium polysulphide solution, to which sulphur and ammonia are added, to remove cyanide compounds from the gas in the form of ammonium sulphocyanate.

In testimony whereof I affix my signature.

CHRISTIAN JOHANNES HANSEN.